Sept. 2, 1969  W. LUDLOFF  3,465,191
FLASH DISCHARGE TUBE FOR EXPOSING EMULSIONS
SENSITIVE TO ARTIFICIAL LIGHT
Filed July 19, 1967
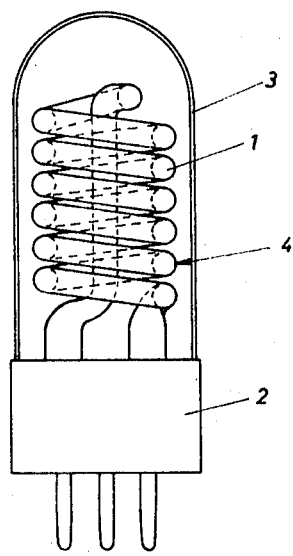
INVENTOR:
Wolfgang Ludloff
BY
Darby, Robertson & Vandenburgh
attys

United States Patent Office 3,465,191
Patented Sept. 2, 1969

3,465,191
FLASH DISCHARGE TUBE FOR EXPOSING EMULSIONS SENSITIVE TO ARTIFICIAL LIGHT
Wolfgang Ludloff, Porz-Westhoven, Germany, assignor to Gesellschaft für Multiblitzgerate Dr.-Ing. D. A. Mannesmann m.b.H., Porz-Westhoven, Germany
Filed July 19, 1967, Ser. No. 654,456
Claims priority, application Germany, Sept. 23, 1966, G 47,961
Int. Cl. H01j *1/62, 63/04*
U.S. Cl. 313—109          1 Claim

ABSTRACT OF THE DISCLOSURE

High-performance flash discharge tube with lower color temperature, less light loss, and decreased fluorescent coating wear. The flash discharge tube resides within a protective transparent tube, both being supported by the same socket, and has no fluorescent coating on its interior, but does have fluorescent coating on its exterior.

---

The invention relates to a flash discharge tube of quartz serving for the exposure of emulsions which are sensitive to artificial light. It has already been proposed to employ high-performance flash discharge tube for enlargement and reproduction purposes instead of incandescent lamps in a manner in which a plurality of short flash discharges is produced within the exposure period (stroboscopic exposure). Such stroboscopic exposure improves the contrast and detail. Only those materials having emulsions sensitive to artificial light are available for separation negatives in preparing coloured reproductions and enlargements. The use of a flash discharge tube for exposing such emulsions however involves considerable difficulties. The colour temperature of the flash discharge tube is approximately 6200° Kelvin. Strong filtering of the light emitted by the flash discharge tube is therefore necessary so that approximately 65% of the light output is lost.

The object of the invention is to substantially reduce the light losses which occur in this context in the exposure by flash discharge tubes.

It is known to reduce the colour temperature of gas discharge tubes for illumination purposes by the use of fluorescent substances. In so-called fluorescent tubes the interior of the discharge tube constructed of glass is coated with a suitable fluorescent material. It is however not possible to construct a high-performance flash discharge tube in a corresponding manner in order to reduce the colour temperature. Owing to the exceptionally high current density of such flash discharge tubes there is a relatively high pressure in the tube which causes eddy effects so that a fluorescent coating would not be able to withstand the stresses.

According to the invention the outer surface of the flash discharge tube is provided with a fluorescent coating. To enable the fluorescent coating to become effective it is necessary that the flash discharge tube be constructed of quartz, a procedure which is in any case normally adopted owing to the desired UV transmittance. In order to protect the sensitive fluorescent coating applied to the exterior from touching, the flash discharge tube must be surrounded by a transparent protective tube, a procedure which is also common. It has been shown that it is possible in this way and with only a moderate loss of light to reduce the colour temperature of the flash discharge tube to approximately 3500° Kelvin so that filtering is hardly necessary or only to a lesser extent in order to expose emulsions sensitive to artificial light. The overall light loss may thus be reduced by approximately 30%.
It might be thought possible for the fluorescent coating to be applied to the internal surface of the protecting tube. However, it has been shown that such a procedure is disadvantageous as regards the light yield and does not provide any marked improvement.

The accompanying drawing shows a flash discharge tube according to one embodiment of the invention now described by way of example.

Referring to the drawing, the coiled flash discharge tube 1 is supported by a conventional plug socket 2. The flash discharge tube 1, normally constructed of quartz having a high transmittance to UV, is enclosed by a transparent protective tube 3. To reduce the colour temperature the external surface 4 of the flash discharge tube is provided with a coating of fluorescent materials, said coating being protected against touching and mechanical damage by the protective tube 3.

I claim:
1. In the combination comprising a transparent protective tube, a quartz flash discharge tube, and a plug socket, said flash discharge tube being of the type which is constructed to generate a flash discharge within the interior of the flash discharge tube, in which combination the flash discharge tube resides within the protective tube, both tubes being supported by said socket, the improvement in which the interior surface of the discharge tube is free of fluorescent coating, and the visible exterior wall of the discharge tube is coated with a fluorescent material.

References Cited

UNITED STATES PATENTS

| 2,009,215 | 7/1935 | Abshagen | 313—109 X |
| 2,424,454 | 7/1947 | Gordon | 313—109 |
| 2,459,633 | 1/1949 | Farris. | |
| 2,788,462 | 4/1957 | MacFarlane | 313—220 X |

FOREIGN PATENTS 906,947   4/1945   France.

JAMES W. LAWRENCE, Primary Examiner
DAVID O'REILLY, Assistant Examiner

U.S. Cl. X.R.
313—205, 220; 315—241